United States Patent
Chun

(10) Patent No.: US 11,075,427 B2
(45) Date of Patent: Jul. 27, 2021

(54) SECONDARY BATTERY INCLUDING CAP ASSEMBLY WITH REINFORCEMENT PLATE

(71) Applicant: Samsung SDI Co., Ltd., Yongin-si (KR)

(72) Inventor: Byoungmin Chun, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 169 days.

(21) Appl. No.: 15/365,082

(22) Filed: Nov. 30, 2016

(65) Prior Publication Data
US 2017/0187019 A1    Jun. 29, 2017

(30) Foreign Application Priority Data
Dec. 24, 2015 (KR) .......................... 10-2015-0186184

(51) Int. Cl.
*H01M 2/12* (2006.01)
*H01M 10/0525* (2010.01)
(Continued)

(52) U.S. Cl.
CPC ....... *H01M 50/342* (2021.01); *H01M 10/058* (2013.01); *H01M 10/0525* (2013.01);
(Continued)

(58) Field of Classification Search
CPC ........... C08L 23/02; C08L 67/02; C08K 3/22; C08K 3/0033; C08K 3/013;
(Continued)

(56) References Cited

U.S. PATENT DOCUMENTS 6,620,544 B1    9/2003  Shin et al.
2004/0237293 A1  12/2004 Durkot et al.
(Continued)

FOREIGN PATENT DOCUMENTS

EP    2200116 A2   6/2010
JP    H09-190820   7/1997
(Continued)

OTHER PUBLICATIONS

Engineering Tool Box, (2003). Young's Modulus—Tensile and Yield Strength for common Materials. [online] Available at: https://www.engineeringtoolbox.com/young-modulus-d_417.html (Year: 2003).*

(Continued)

*Primary Examiner* — Zhongqing Wei
(74) *Attorney, Agent, or Firm* — Lewis Roca Rothgerber Christie LLP

(57) ABSTRACT

A secondary battery including: an electrode assembly; a case accommodating the electrode assembly; and a cap assembly coupled to the case. The cap assembly includes: a cap-up exposed at a top of the cap assembly; a safety vent under the cap-up; and a reinforcement plate between the cap-up and the safety vent and extending along a periphery of the cap-up. The safety vent includes a protrusion protruding toward the electrode assembly and is electrically connected to the electrode assembly via the protrusion.

9 Claims, 4 Drawing Sheets

(51) Int. Cl.
*H01M 10/058* (2010.01)
*H01M 2/34* (2006.01)
*H01M 50/342* (2021.01)
*H01M 50/30* (2021.01)
*H01M 50/147* (2021.01)
*H01M 50/578* (2021.01)

(52) U.S. Cl.
CPC ......... *H01M 50/147* (2021.01); *H01M 50/30* (2021.01); *H01M 50/578* (2021.01); *H01M 2200/20* (2013.01)

(58) Field of Classification Search
CPC .... H01M 2/0426; H01M 2/0456; H01M 2/12; H01L 2933/0058; H01L 33/60; Y02E 60/12
See application file for complete search history.

(56) References Cited

U.S. PATENT DOCUMENTS

| | | |
|---|---|---|
| 2009/0233157 A1 | 9/2009 | Kim |
| 2010/0015508 A1 | 1/2010 | Hwang |
| 2010/0143772 A1* | 6/2010 | Byun ................. H01M 2/0413 429/82 |
| 2010/0143796 A1* | 6/2010 | Mao .................. H01M 2/0426 429/185 |
| 2010/0159288 A1* | 6/2010 | Kim .................... H01M 2/0413 429/7 |
| 2010/0209765 A1* | 8/2010 | Bak .................... H01M 2/1241 429/164 |
| 2011/0076527 A1* | 3/2011 | Kim ....................... H01M 2/34 429/53 |
| 2013/0183556 A1 | 7/2013 | Kim |

FOREIGN PATENT DOCUMENTS

| | | | |
|---|---|---|---|
| JP | 11273708 A | * | 10/1999 |
| JP | H11-354091 | | 12/1999 |
| JP | 2006-12604 A | | 1/2006 |
| JP | 2006012604 A | * | 1/2006 |
| KR | 10-2006-0086125 A | | 7/2006 |
| KR | 10-2007-0107922 A | | 11/2007 |
| KR | 10-2009-0099273 A | | 9/2009 |

OTHER PUBLICATIONS

Extended European Search Report dated Mar. 13, 2017 of the corresponding European Patent Application No. 16205934.9, noting listed reference in this IDS (7 pages).

Chinese Intellectual Property Office Action for corresponding Chinese Patent Application No. 201611204425.X, dated Sep. 3, 2020, 10 pages.

* cited by examiner

SECONDARY BATTERY INCLUDING CAP ASSEMBLY WITH REINFORCEMENT PLATE

CROSS-REFERENCE TO RELATED APPLICATION

This application claims priority to and the benefit of Korean Patent Application No. 10-2015-0186184, filed on Dec. 24, 2015 in the Korean Intellectual Property Office, the contents of which are incorporated herein in their entirety by reference.

BACKGROUND

1. Field

Aspects of the present invention relate to a secondary battery.

2. Description of the Related Art

If a secondary battery enters a state of abnormal use, such as a short circuit or overcharge condition, an internal temperature of the battery may rise and gases may be generated that increase the internal pressure of the battery.

For example, if a lithium secondary battery is overcharged, an electrolyte may decompose to release gases, such as carbon dioxide or carbon monoxide, increasing the internal pressure of the battery. In addition, if an overcurrent flows through a lithium secondary battery due to an over-discharge or a short-circuit, the internal temperature of battery may increase, causing an electrolyte to convert into gases. Accordingly, the internal pressure and temperature of battery may rise and present a risk of ignition, which may become a serious safety-related issue or concern and which may cause an overall deterioration in the performance and life characteristics of the battery.

SUMMARY

Embodiments of the present invention provide a secondary battery having improved mechanical strength and which can be manufactured by a simplified manufacturing process.

The above and other aspects of the present invention will be described in or will be apparent from the following description of exemplary embodiments.

According to an aspect of the present invention, a secondary battery includes: an electrode assembly; a case accommodating the electrode assembly; and a cap assembly coupled to the case. The cap assembly includes a cap-up exposed at a top of the cap assembly; a safety vent under the cap-up; and a reinforcement plate between the cap-up and the safety vent and extending along a periphery of the cap-up. The safety vent includes a protrusion protruding toward the electrode assembly and is electrically connected to the electrode assembly via the protrusion.

The reinforcement plate may have a ring shape.

The reinforcement plate may be arranged between the cap-up and the safety vent.

The reinforcement plate may be crimped together with the safety vent to be coupled to an interior side of the case.

The reinforcement plate may include stainless steel.

The reinforcement plate and the cap-up may have the same thickness.

An edge of the reinforcement plate may extend to an interior region of the cap assembly such that it is exposed under the cap-up.

The edge of the reinforcement plate may be in contact with the safety vent.

The edge of the reinforcement plate may be inclined with respect to an extension direction of the reinforcement plate.

The safety vent may be configured to invert when an internal pressure of the case exceeds a reference pressure, and the safety vent may be further configured such that the inversion begins at the edge of the reinforcement plate.

As described above, in the secondary battery according to an embodiment of the present invention, a reinforcement plate having relatively high mechanical strength is provided between a cap-up and a safety vent, thereby improving the warpage strength of the cap-up and providing an increased swelling region under the cap-up.

In addition, the thickness of the cap-up may be reduced by improving the warpage strength of the reinforcement plate, thereby reducing a pressure for a pressing process for forming the cap-up and increasing the manufacturability of the secondary battery.

BRIEF DESCRIPTION OF THE DRAWINGS

The above and other aspects and features of the present invention will become more apparent by describing, in detail, exemplary embodiments thereof with reference to the attached drawings in which.

DETAILED DESCRIPTION

Figure 1:
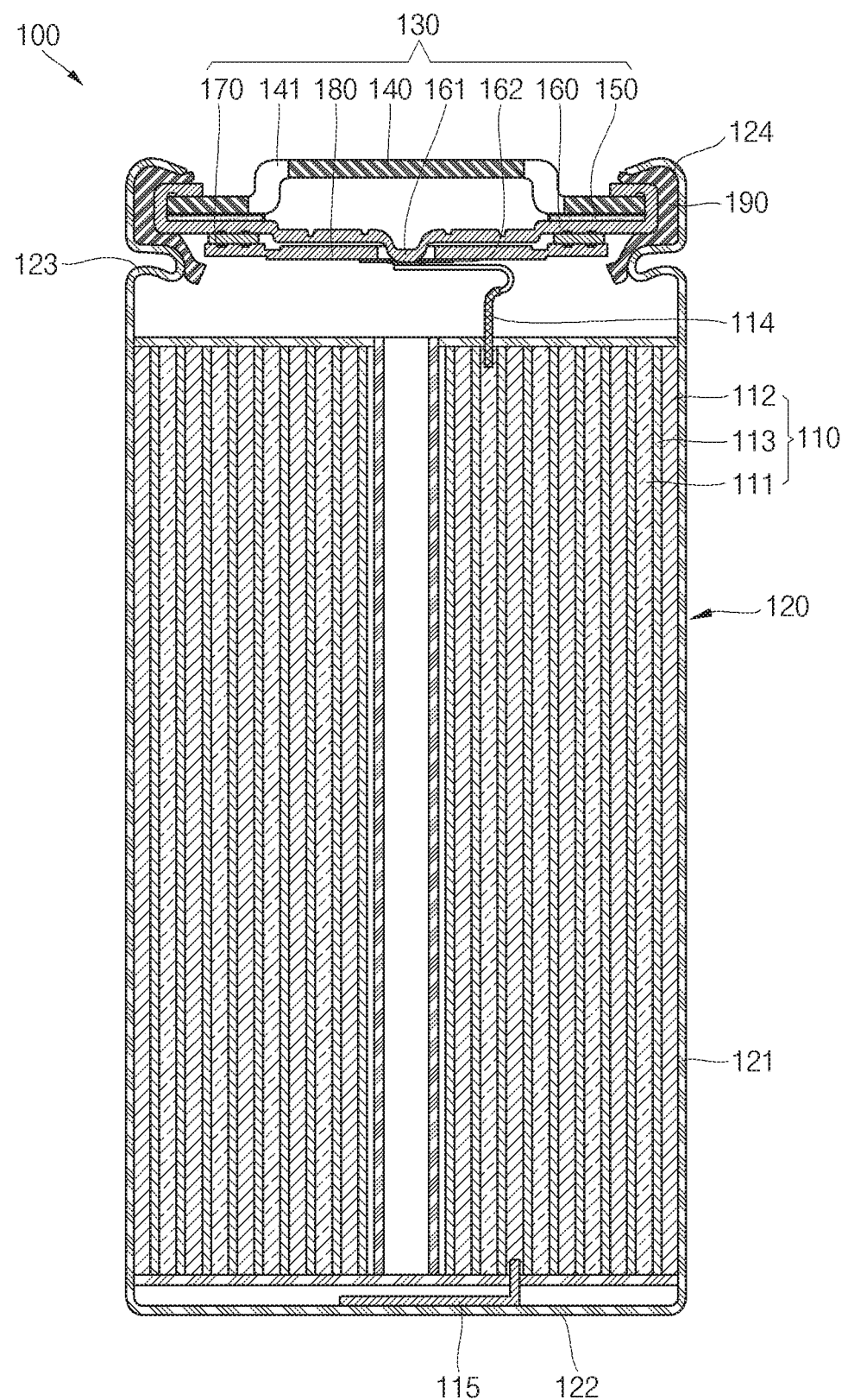
FIG. 1 is a cross-sectional view of a secondary battery according to an exemplary embodiment of the present invention.

Hereinafter, exemplary embodiments of the present invention will be described, in detail, with reference to the accompanying drawings such that they can easily be made and used by those skilled in the art.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
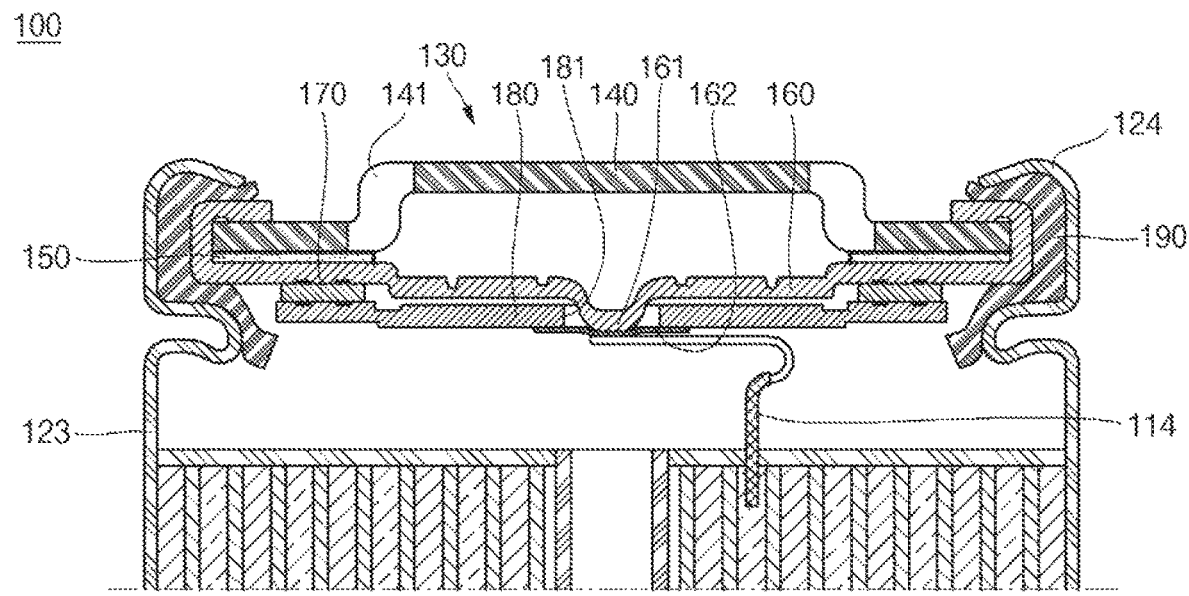
FIG. 2 is an enlarged cross-sectional view illustrating a cap assembly shown in FIG. 1.

FIG. 1 is a cross-sectional view of a secondary battery according to an exemplary embodiment of the present invention, and FIG. 2 is an enlarged cross-sectional view illustrating a cap assembly shown in FIG. 1.

Referring to FIGS. 1 and 2, a secondary battery 100 according to an exemplary embodiment of the present invention includes an electrode assembly 110, a case 120 accommodating the electrode assembly 110, a cap assembly 130 coupled to the case 120 at a top opening thereof, and a gasket 190 tightly closing (e.g., sealing) a gap between the case 120 and the cap assembly 130.

The electrode assembly 110 includes a first electrode plate 111, a second electrode plate 112, and a separator 113 interposed between the first electrode plate 111 and the second electrode plate 112. The electrode assembly 110 may be formed by winding a stacked structure of the first electrode plate 111, the separator 113, and the second electrode plate 112 in a jelly-roll configuration. In one embodiment, the first electrode plate 111 may function as a positive electrode and the second electrode plate 112 may function as a negative electrode. However, the present invention is not limited thereto, and in other embodiments, the first electrode plate 111 may function as the negative electrode and the second electrode plate 112 may function as the positive electrode.

The first electrode plate 111 is formed by coating a first electrode active material, such as a transition metal oxide, on a first electrode current collector including (e.g., made of) a metal foil, such as an aluminum foil. A first electrode tab 114 is attached to the first electrode plate 111. One end of the first electrode tab 114 is connected to (e.g., electrically connected to) the first electrode plate 111, and the other end of the first electrode tab 114 protrudes above (e.g., protrudes to an upper portion of) the electrode assembly 110 to be connected to (e.g., electrically connected to) the cap assembly 130.

The second electrode plate 112 is formed by coating a second electrode active material, such as graphite or carbon, on a second electrode current collector including (e.g., made of) a metal foil, such as a copper or nickel foil. A second electrode tab 115 is attached to the second electrode plate 112. One end of the second electrode tab 115 is connected to (e.g., electrically connected to) the second electrode plate 112, and the other end of the second electrode tab 115 protrudes below (e.g., protrudes to a lower portion of) the electrode assembly 110 to be connected to (e.g., electrically connected to) a bottom surface of the case 120.

The separator 113 is positioned between the first electrode plate 111 and the second electrode plate 112 to prevent an electric short therebetween and to allow lithium ions to move therebetween. The separator 113 may include (e.g., may be made of) polyethylene (PE), polypropylene (PP), or a copolymer of polyethylene (PE) and polypropylene (PP).

The case 120 includes a side surface plate 121 having a cylindrical shape with a diameter (e.g., a predetermined diameter) forming a space for accommodating the electrode assembly 110 and a bottom plate 122 sealing a bottom portion or bottom end of the side surface plate 121. The case 120 has a top opening configured to be closed after the electrode assembly 110 is inserted and placed therein. In addition, a bead 123 (e.g., a beading part) for preventing the electrode assembly 110 from moving or substantially moving within the case 120 is formed at a top portion of the case 120. In addition, a crimp 124 (e.g., a crimping part) for fixing the cap assembly 130 and the gasket 190 is formed at a topmost part (e.g., a top end) of the case 120.

The cap assembly 130 includes a cap-up 140, a reinforcement plate 150 under the cap-up 140 (e.g., arranged between the cap-up 140 and the electrode assembly 110), a safety vent 160 coupled to a bottom portion or bottom surface of the reinforcement plate 150, a cap-down 180 under the safety vent 160, and an insulator 170 interposed between the safety vent 160 and the cap-down 180. In addition, a sub-plate 162 is fixed to a bottom surface of the safety vent 160, is exposed through an opening 181 (e.g., a through-hole) in the cap-down 180 (e.g., is exposed to the cap assembly 130), and is electrically connected to the first electrode tab 114.

The cap-up 140 has an upwardly convex shape to be electrically connected to an external circuit. The cap-up 140 has a gas discharge opening 141 (e.g., a gas discharge hole or gas discharge openings) providing a path through which internal gases generated in the case 120 can be discharged therefrom. The cap-up 140 is electrically connected to the electrode assembly 110 and transmits current generated by the electrode assembly 110 to the external circuit.

The reinforcement plate 150 is coupled between the cap-up 140 and the safety vent 160. In one embodiment, the reinforcement plate 150 has a ring shape and extends along edges of (e.g., a periphery of) the cap-up 140 and the safety vent 160. In addition, the reinforcement plate 150 may be coupled to the cap-up 140 by a crimping operation for forming the crimp 124, without using a separate welding process. In addition, as will be further described later, the edge of the cap-up 140 is covered or surrounded by the edge of the safety vent 160 such that the cap-up 140 and the safety vent 160 may be electrically connected to each other through the reinforcement plate 150.

The reinforcement plate 150 may reinforce or improve the mechanical strength of the cap-up 140. For example, the reinforcement plate 150 may include (e.g., may be made of) stainless steel having relatively high strength and may improve the warpage strength of the cap-up 140 (e.g., may improve resistance of the cap-up 140 to warpage). Therefore, the thickness of the cap-up 140 may be reduced while maintaining its strength, thereby increasing a swelling region below the cap-up 140. Therefore, when the safety vent 160 inverts due to, for example, a certain pressure or greater (e.g., a predetermined pressure or greater) being reached in the case 120, a sufficient space for inversion can be provided, thereby increasing the operating reliability of the safety vent 160. In addition, because the thickness of the cap-up 140 is reduced by reinforcing the warpage strength of the cap-up 140, a pressing process for forming the cap-up 140 may use a lower pressure (e.g., the pressing process for forming the cap-up 140 may be easier), thereby increasing manufacturability of the secondary battery 100.

The safety vent 160 has a circular plate shape corresponding to the cap-up 140 and has a centrally formed protrusion 161 protruding downwardly (e.g., protruding toward the electrode assembly 110). The safety vent 160 also has a first horizontal portion 163, a second horizontal portion 164, a vertical portion 165 connecting the first horizontal portion 163 to the second horizontal portion 164, a third horizontal portion 166, and a second vertical portion 167 extending between the first horizontal portion 163 and the third horizontal portion 166. The safety vent 160 is electrically connected to the sub-plate 162, which is fixed to the bottom surface of the cap-down 180, by the protrusion 161 which passes through the opening 181 in the cap-down 180. In one embodiment, the protrusion 161 and the sub-plate 162 of the safety vent 160 may be welded to each other by, for example, laser welding, ultrasonic welding, resistance welding, or a similar method or process.

The safety vent 160 is installed to be in close contact with a portion of the cap-up 140 around (e.g., other than or except for) an upwardly protruding portion of the cap-up 140, and if the internal pressure of the case 120 exceeds a certain level (e.g., a predetermined level), internal gases are released while cutting off the flow of current. If the internal pressure of the case 120 exceeds a certain pressure (e.g., an operating pressure of the safety vent 160), the safety vent 160 electrically disconnects from the sub-plate 162 while the protrusion 161 moves upwardly due to the gases discharged through a gas discharge opening 182 (e.g., a gas discharge hole or gas discharge openings) in the cap-down 180.

In one embodiment, the sub-plate 162 electrically disconnects from the safety vent 160 when the welded portion of the protrusion 161 is broken or torn. In addition, if the internal pressure of the case 120 exceeds a rupture pressure, which is greater than the operating pressure of the safety vent 160, the safety vent 160 ruptures.

The sub-plate 162 is positioned under the cap-down 180. The sub-plate 162 is welded between the first electrode tab 114 and the protrusion 161 of the safety vent 160, which passes through the opening 181 in the cap-down 180. Accordingly, the sub-plate 162 electrically connects the first electrode tab 114 and the protrusion 161 to each other. If the internal pressure of the case 120 increases (e.g., increases beyond a certain level), the protrusion 161 moves upwardly such that the sub-plate 162 disconnects (e.g., electrically disconnects) from the protrusion 161. Therefore, the safety vent 160 may be electrically disconnected from the first electrode tab 114.

The insulator 170 is interposed between the safety vent 160 and the cap-down 180 and insulates (e.g., electrically insulates) the safety vent 160 and the cap-down 180 from each other. The insulator 170 may include (e.g., may be made of) a resin material, such as polyethylene (PE), polypropylene (PP), or polyethylene terephthalate (PET).

The cap-down 180 is a circular plate. The opening 181 is formed at the center of the cap-down 180, and the protrusion 161 of the safety vent 160 passes or extends through the opening 181. In addition, an insulation layer may be formed on a top surface of the cap-down 180. The insulation layer may insulate (e.g., electrically insulate) the safety vent 160 and the cap-down 180 from each other.

The gasket 190 is installed in a top opening of the case 120. For example, the gasket 190 is assembled such that it is in contact with (e.g., covers or surrounds) outer peripheries of the cap-up 140 and the safety vent 160 and seals the top opening of the case 120. The gasket 190 may prevent the cap assembly 130 from being separated from the case 120.

As described above, the secondary battery 100 according to an embodiment of the present invention includes the reinforcement plate 150 having relatively high mechanical strength provided between the cap-up 140 and the safety vent 160, thereby improving the warpage strength of the cap-up 140 and increasing a swelling region below the cap-up 140. In addition, the thickness of the cap-up 140 may be reduced due to the increased warpage strength of the reinforcement plate 150, thereby reducing pressure of a pressing process for forming the cap-up 140 and increasing the ease of manufacturing.

Hereinafter, a configuration of a secondary battery according to another embodiment of the present invention will be described.

Figure 3:
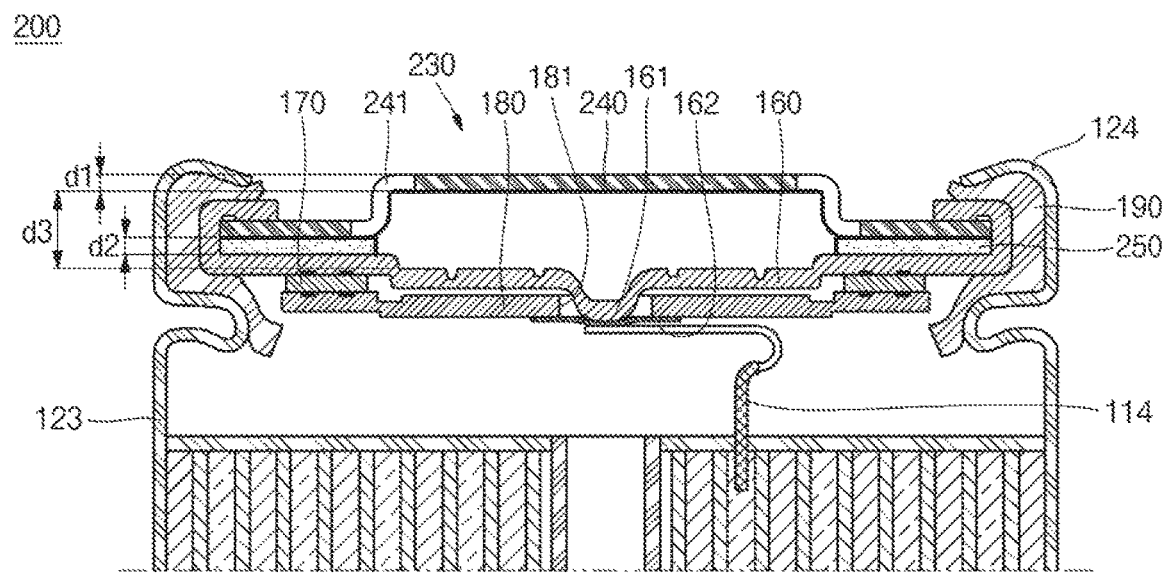
FIG. 3 is an enlarged cross-sectional view illustrating a cap assembly of a secondary battery according to another exemplary embodiment of the present invention.

FIG. 3 is an enlarged cross-sectional view illustrating a cap assembly of a secondary battery (200) according to another embodiment of the present invention.

Referring to FIG. 3, the secondary battery 200 according to another embodiment of the present invention includes an electrode assembly 110, a case 120 accommodating the electrode assembly 110, a cap assembly 230 coupled to the case 120 at a top opening thereof, and a gasket 190 tightly closing (e.g., sealing) a gap between the case 120 and the cap assembly 230. The same or substantially similar components are denoted by the same reference numerals as those of the previously-described embodiment, and the following description may primarily focus on differences between the presently-described and previously-described embodiments.

The cap assembly 230 includes a cap-up 240, a reinforcement plate 250 under the cap-up 240, a safety vent 160 coupled to a bottom portion or bottom surface of the reinforcement plate 250, a cap-down 180 under the safety vent 160, and an insulator 170 interposed between the safety vent 160 and the cap-down 180.

In the presently-described embodiment, a thickness d1 of the cap-up 240 may be smaller than that of the cap-up 140 in the secondary battery 100 according to the previously-described embodiment. The cap-up 240 may have further increased warpage strength due to the reinforcement plate 250. In addition, as will be further described later, when the reinforcement plate 250 is thicker than the reinforcement plate 150 according to the previously-described embodiment, the thickness d1 of the cap-up 240 may be further reduced while maintaining the safety of the secondary battery 200. Therefore, because the thickness d1 of the cap-up 240 is relatively small, a height d3 of a swelling region below the cap-up 240 may be increased, thereby increasing operating reliability of the safety vent 160. In addition, the pressure of a pressing process for forming the cap-up 240 may be even further reduced, thereby increasing ease of manufacturing.

The reinforcement plate 250 is arranged under the cap-up 240 and extends along an outer edge (e.g., a periphery) of the cap-up 240. A thickness d2 of the reinforcement plate 250 may be greater than a thickness of the reinforcement plate 150 in the secondary battery 100 according to the previously-described embodiment. For example, the thickness d2 of the reinforcement plate 250 may be the same or substantially the same as the thickness d1 of the cap-up 240. Therefore, as described above, because the mechanical strength of the cap-up 240 can be further increased, the thickness d1 of the cap-up 240 can be further reduced.

Hereinafter, a configuration of a secondary battery according to still another embodiment of the present invention will be described.

Figure 4:
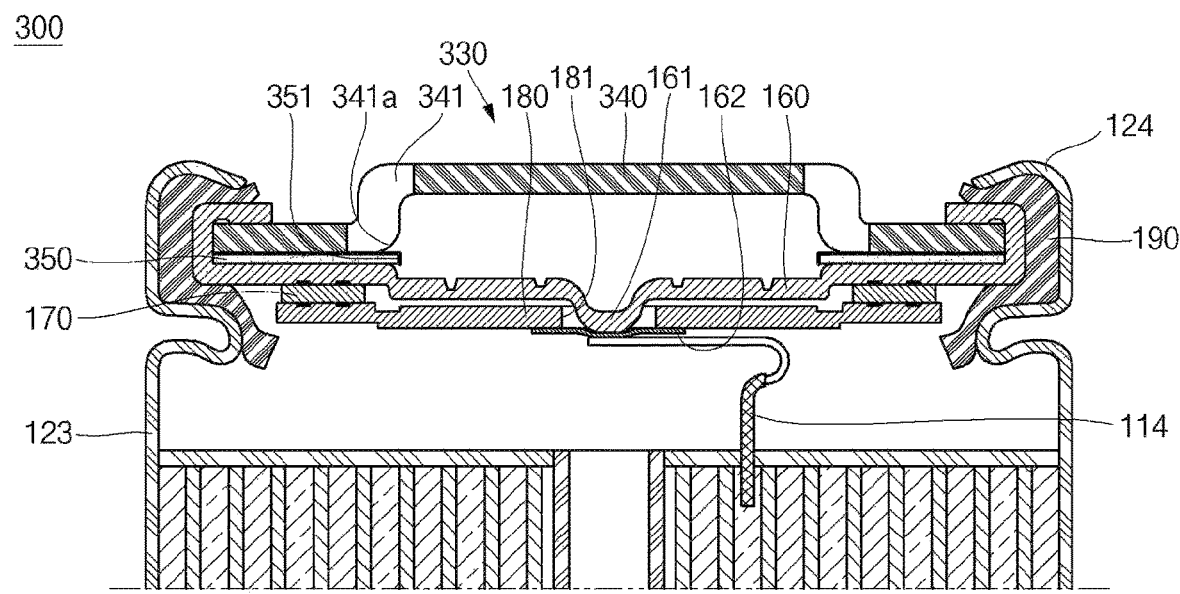
FIG. 4 is an enlarged cross-sectional view illustrating a cap assembly of a secondary battery according to still another exemplary embodiment of the present invention.

FIG. 4 is an enlarged cross-sectional view illustrating a cap assembly of a secondary battery (300) according to still another embodiment of the present invention.

Referring to FIG. 4, the secondary battery 300 according to still another embodiment of the present invention includes an electrode assembly 110, a case 120 accommodating the electrode assembly 110, a cap assembly 330 coupled to the case 120 at a top opening thereof, and a gasket 190 tightly closing (e.g., sealing) a gap between the case 120 and the cap assembly 330.

The cap assembly 330 includes a cap-up 340, a reinforcement plate 350 under the cap-up 340, a safety vent 160 coupled to a bottom portion or bottom surface of the reinforcement plate 350, a cap-down 180 under the safety vent 160, and an insulator 170 interposed between the safety vent 160 and the cap-down 180.

In this embodiment, the reinforcement plate 350 is extended beyond a region at which the cap-up 340 and the reinforcement plate 350 contact each other, different from the cap-up 140 in the secondary battery 100 according to the previously-described embodiment. Therefore, the reinforcement plate 350 may be configured such that it protrudes further toward an interior of the cap-up 340 (e.g., protrudes further toward a center of the cap assembly 330) to be exposed. Therefore, the cap-up 340 may be formed regardless of the inverting operation of the safety vent 160, and a degree of freedom in designing the cap-up 340 can be increased. For example, an area of a top plane of the cap-up 340 may be increased, thereby improving a welding process to be performed later.

The reinforcement plate 350 further protrudes toward the interior of the cap-up 340 to be exposed under the cap-up 340. Therefore, the reinforcement plate 350 may be coupled to the safety vent 160 regardless of the cap-up 340. Accordingly, an interior edge 351 (e.g., an interior end) of the reinforcement plate 350 may provide an inversion starting point of the safety vent 160, regardless of the position of the cap-up 340. Therefore, the operating pressure of the safety vent 160 can be maintained at a certain level (e.g., a constant level) by the reinforcement plate 350.

Hereinafter, a configuration of a secondary battery according to still another embodiment of the present invention will be described.

Figure 5:
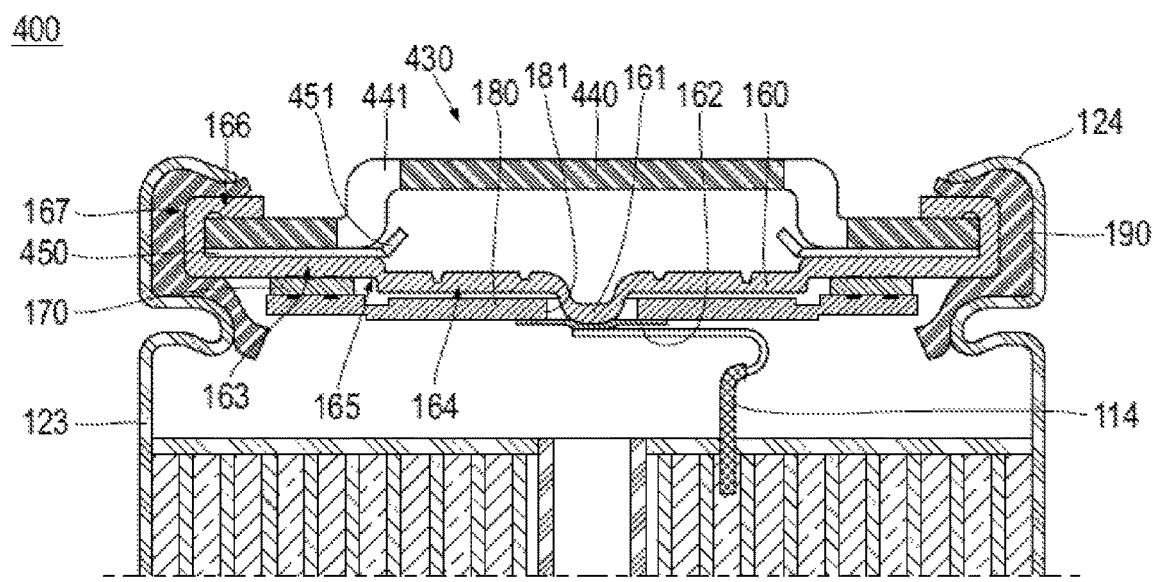
FIG. 5 is an enlarged cross-sectional view illustrating a cap assembly of a secondary battery according to still another exemplary embodiment of the present invention.
Figure 6:
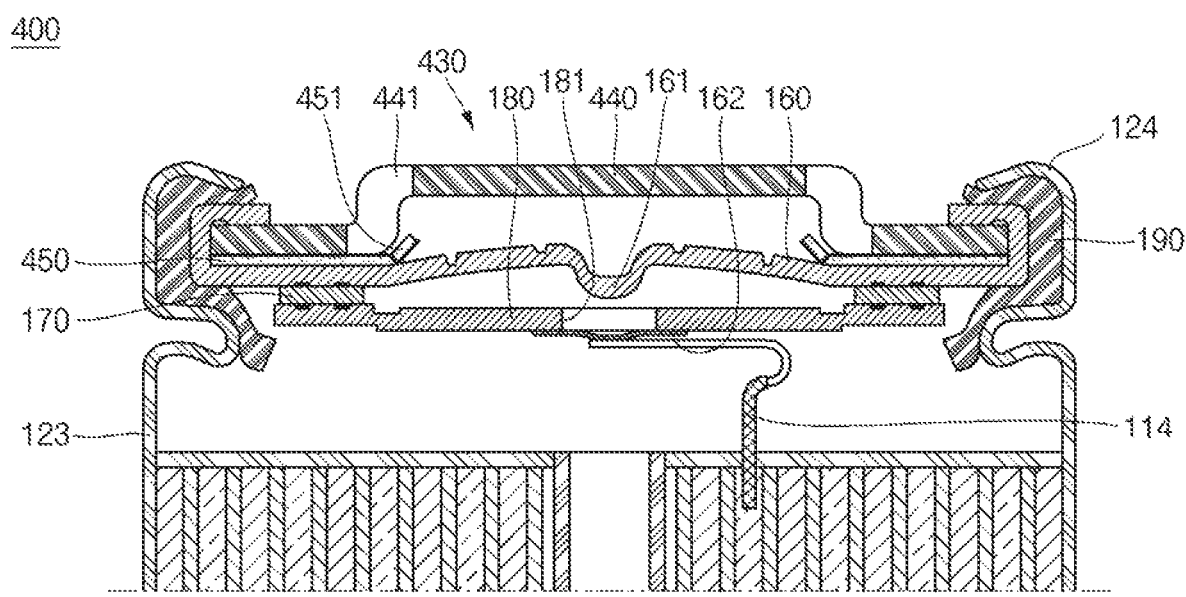
FIG. 6 is a cross-sectional view illustrating a state in which a safety vent operates when a short circuit occurs in a secondary battery shown in FIG. 5.

FIG. 5 is an enlarged cross-sectional view illustrating a cap assembly of a secondary battery according to still another embodiment of the present invention, and FIG. 6 is a cross-sectional view illustrating a state in which a safety vent operates when a short circuit occurs in the secondary battery shown in FIG. 5.

Referring to FIG. 5, a secondary battery 400 according to still another embodiment of the present invention includes an electrode assembly 110, a case 120 accommodating the electrode assembly 110, a cap assembly 430 coupled to the case 120 at a top opening thereof, and a gasket 190 tightly closing (e.g., sealing) a gap between the case 120 and the cap assembly 430.

The cap assembly 430 includes a cap-up 440, a reinforcement plate 450 under the cap-up 440, a safety vent 160 coupled to a bottom portion or bottom surface of the reinforcement plate 450, a cap-down 180 under the safety vent 160, and an insulator 170 interposed between the safety vent 160 and the cap-down 180.

In this embodiment, similar to reinforcement plate 350 of the secondary battery 300 according to the previously-described embodiment, the reinforcement plate 450 may protrude into a region under the cap-up 440 beyond where it contacts the cap-up 440. For example, the reinforcement plate 450 may be configured such that it further protrudes to an interior of the cap-up 440 to be exposed under the cap-up 440. Therefore, a degree of freedom in designing the cap-up 440 can be increased. An interior edge 451 (e.g., an interior end) of the reinforcement plate 450 may be formed to be inclined with respect to a horizontal direction in which the reinforcement plate 450 extends (e.g., may be inclined with respect to an extension direction of the reinforcement plate 450). Therefore, a region where the inclined portion of the interior edge 451 meets the remaining portion of the reinforcement plate 450 (e.g., a horizontal portion of the reinforcement plate 450) may contact the safety vent 160, and the region may be an inversion starting point of the safety vent 160. In addition, when the safety vent 160 inverts, the interior edge 451 may control displacement or movement of the safety vent 160 due to, for example, swelling, thereby increasing the reliability of a rupture operation. Therefore, even if there are errors in the design and/or manufacturing of the safety vent 160, the operating pressure of the safety vent 160 can be maintained at a certain level (e.g., a constant level), and a degree of freedom in designing components can be increased.

While secondary batteries have been particularly shown and described with reference to exemplary embodiments of the present invention, it will be understood by those of ordinary skill in the art that various changes in form and details may be made therein without departing from the spirit and scope of the present invention as defined by the following claims and their equivalents.

What is claimed is:

1. A secondary battery comprising:
   an electrode assembly;
   a case accommodating the electrode assembly; and
   a cap assembly coupled to the case, the cap assembly comprising:
   a cap-up exposed at a top of the cap assembly;
   a safety vent under the cap-up and comprising a protrusion protruding toward the electrode assembly, the safety vent being electrically connected to the electrode assembly via the protrusion; and a reinforcement plate between the cap-up and the safety vent and directly physically contacting the cap-up and the safety vent, the reinforcement plate extending along a periphery of the cap-up and comprising stainless steel, wherein at least a portion of the cap-up directly physically contacts at least a portion of the safety vent, and wherein an interior edge of the reinforcement plate extends toward an interior region of the cap assembly such that it is exposed under the cap-up, wherein, in a first state in which the safety vent is electrically connected to the electrode assembly, an inclined portion of the interior edge of the reinforcement plate is inclined with respect to an extension direction of the reinforcement plate, and wherein, in a second state when an internal pressure of the case exceeds a reference pressure, the safety vent inverts to be electrically disconnected from the electrode assembly.

2. The secondary battery of claim 1, wherein the reinforcement plate has a ring shape.

3. The secondary battery of claim 1, wherein the reinforcement plate and the safety vent are crimped together and coupled to an interior side of the case.

4. The secondary battery of claim 1, wherein the reinforcement plate and the cap-up have the same thickness.

5. The secondary battery of claim 1,
wherein the safety vent is configured such that the inversion begins at the interior edge of the reinforcement plate.

6. The secondary battery of claim 1, further comprising a gasket at a top opening of the case,
wherein at least a portion of the safety vent is located between the gasket and the reinforcement plate in a direction orthogonal to a stacking direction of the reinforcement plate and the cap-up.

7. The secondary battery of claim 1, wherein the safety vent further comprises:
a first horizontal portion;
a second horizontal portion between the electrode assembly and the first horizontal portion; and
a vertical portion connecting the first horizontal portion to the second horizontal portion,
wherein the protrusion protrudes toward the electrode assembly at a central portion of the second horizontal portion.

8. The secondary battery of claim 7, wherein the safety vent further comprises:
a third horizontal portion opposite the first horizontal portion and over both the first and second horizontal portions with respect to the electrode assembly; and
a second vertical portion extending between the first horizontal portion and the third horizontal portion, and
wherein the reinforcement plate and the safety vent are crimped together such that the first horizontal portion directly contacts the reinforcement plate, the second vertical portion directly contacts the reinforcement plate and the cap-up, and the third horizontal portion directly contacts the cap-up.

9. The secondary battery of claim 7, wherein the second horizontal portion of the safety vent has a plurality of indents.

* * * * *